United States Patent
Vetter et al.

(10) Patent No.: US 6,409,545 B1
(45) Date of Patent: Jun. 25, 2002

(54) POWER CAPACITOR

(75) Inventors: Harald Vetter; Ludwig Berg, both of Heidenheim (DE)

(73) Assignee: Siemens Matsushita Components GmbH & Co. KG, Munich (DE)

( * ) Notice: Subject to any disclaimer, the term of this patent is extended or adjusted under 35 U.S.C. 154(b) by 0 days.

(21) Appl. No.: 09/684,654

(22) Filed: Oct. 10, 2000

Related U.S. Application Data

(63) Continuation of application No. PCT/DE99/01017, filed on Apr. 1, 1999.

(30) Foreign Application Priority Data

Apr. 9, 1998 (DE) .......................................... 198 16 215

(51) Int. Cl.⁷ .............................................. H01R 13/66
(52) U.S. Cl. ...................................................... 439/620
(58) Field of Search ........................ 439/620; 361/760, 361/766, 772–76, 791, 803, 857

(56) References Cited

U.S. PATENT DOCUMENTS

| | | | | |
|---|---|---|---|---|
| 3,864,004 A | * | 2/1975 | Friend | 439/844 |
| 5,038,252 A | * | 8/1991 | Johnson | 361/414 |
| 5,624,269 A | * | 4/1997 | Kanamori | 439/83 |
| 5,827,094 A | * | 10/1998 | Aizawa et al. | 439/857 |
| 5,921,820 A | * | 7/1999 | Dijkstra | 439/751 |

FOREIGN PATENT DOCUMENTS

EP           0450122 A1       10/1991

* cited by examiner

*Primary Examiner*—Tho D. Ta
*Assistant Examiner*—Ann M McCamey
(74) *Attorney, Agent, or Firm*—Jacob Eisenberg

(57) ABSTRACT

The invention relates to a power capacitor for use in capacitor banks, which is build into a housing and interconnected by ribbon cables. The capacitor and ribbon cable are interconnected using plug-in functional elements which are mounted on the housing and into which contact arranged on the ribbon cables are inserted

18 Claims, 3 Drawing Sheets

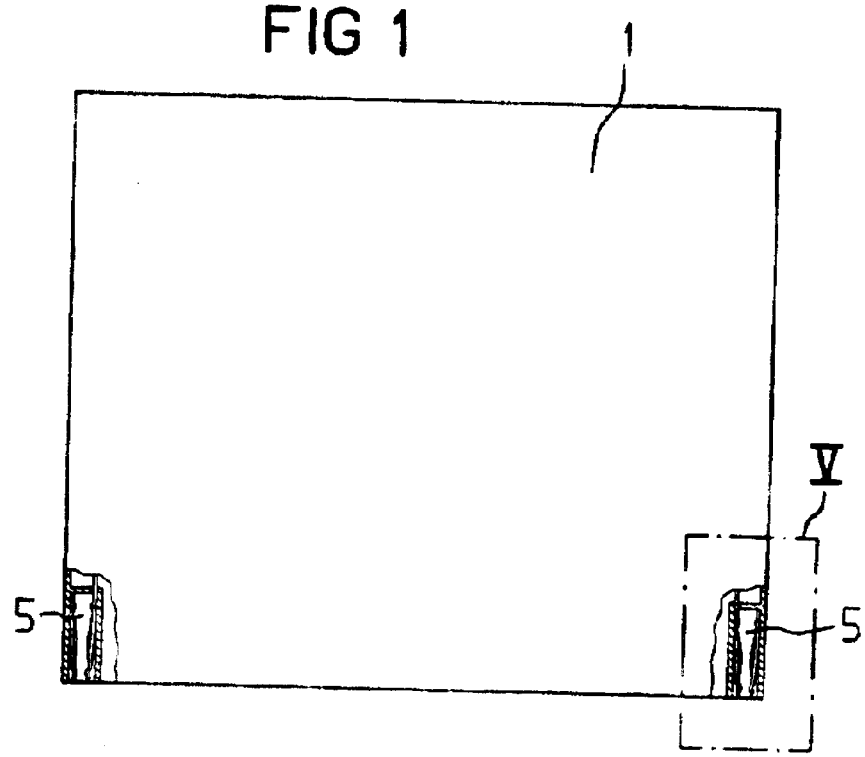
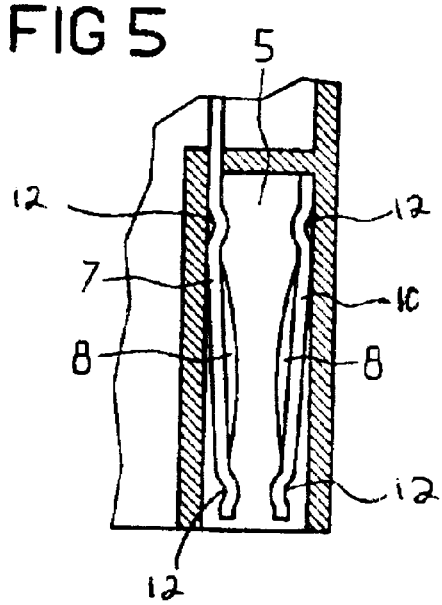

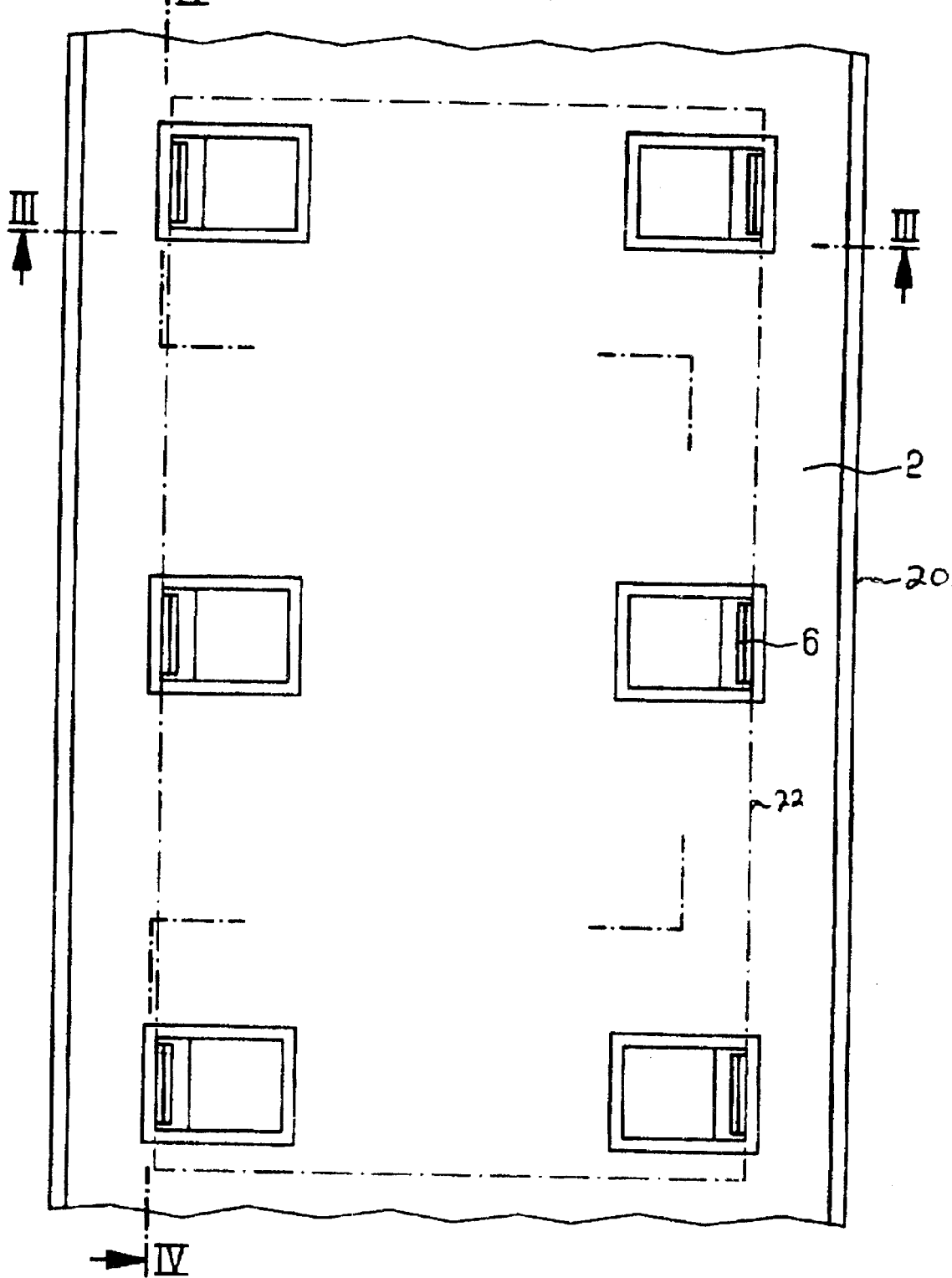

POWER CAPACITOR

CROSS-REFERENCE TO RELATED APPLICATION

This application is a continuation of copending international application PCT/DE99/01017, filed Apr. 1, 1999 which designated the United States.

BACKGROUND OF THE INVENTION

1. Field of the Invention

The present invention relates to the field of capacitor banks and more particularly to an arrangement and method for connecting capacitor components to the capacitor bank boards. The connection is effected such that the capacitor components are securely held in place in an secure and modular manner while electrical connection between the components and board is maintained.

2. Description of Related Art

Condenser banks and capacitors therefor are well known in the art as exemplified by European patent EP 0 450 122 B1. Herein, the capacitors are affixed to a printed circuit board via connecting bolts and nuts and/or solder. The development of these power condensers is directed towards improved inverters and semiconductor valves. Additional applications for power condensers is with IGBT (insulated gate bipolar transistor) semiconductors. The capacity of the capacitor banks ranges from about 100 kilowatts to upwards of 6 megawatts. An additional application for the banks is with rectifiers wherein some success has been achieved through reduction of capacitor component size and lowering of parasitic inductance therebetween. However, the related art applications do not have the modular compactness sometimes desired in the industry, nor the possibility of plugging modular capacitor components onto the capacitor bank boards where such elements are securely held in place and power flows via the connection between component and board. Such possibility simplifies the connection, as no solder and/or nuts and bolts are necessary, thereby reducing engineering and manufacturing costs while increasing design possibilities.

BRIEF SUMMARY OF THE INVENTION

It is accordingly an object of the invention to provide an improved modular arrangement for connecting capacitor components, such as condenser batteries, to boards forming capacitor banks. It is a further object to provide an arrangement which can be implemented so as to enable mass production at reasonable engineering effort and expense and with maximally replicable component characteristics. It is a further object that the capacitor components are snap fitted and/or plugged into the board. It is a further object that the connection be sufficient to facilitate electrical communication of various power levels, as may seem fit to the ordinary designer, between component and board. It is a further object to reduce parasitic inductance and lower resistance in the connection of the components and board. (spread out contacts)

With the foregoing and other objects in view there is provided, in accordance with the invention, an arrangement for attaching at least one capacitor component and a printed circuit board, said arrangement comprising at least one blade contact for conducting electrical power, said blade contact formed by an elevated conductor end of a conductor accommodated by said board; and a number of connection members for effecting electrical communication with said blade contacts, said members formed within said at least one capacitor component and having a housing comprising a cavity and opposing contact leads for receiving said blade contacts therebetween such that said blade contacts are securely held and electrical contact between said blade contacts and said opposing contact leads is maintained.

In addition, the present invention includes a method of attaching a capacitor component to a board comprising the step of plugging a blade connector formed from an elevated conductor end of a conductor housed within said board, into a pair of opposing contact leads within a receiving member which is further formed within said capacitor component, such that said blade connector is snapped fitted between said contact leads and electrical contact is established between said blade connector and receiving member.

The invention is explained in greater detail below by reference to exemplary embodiments shown in the drawings.

BRIEF DESCRIPTION OF THE DRAWINGS

FIG. 1 depicts a side view of a capacitor component;

FIG. 2 depicts a top view of a capacitor bank board,

FIG. 5 depicts an enlarged view a modular connection element.

DESCRIPTION OF PREFERRED EMBODIMENTS

Figure 3:
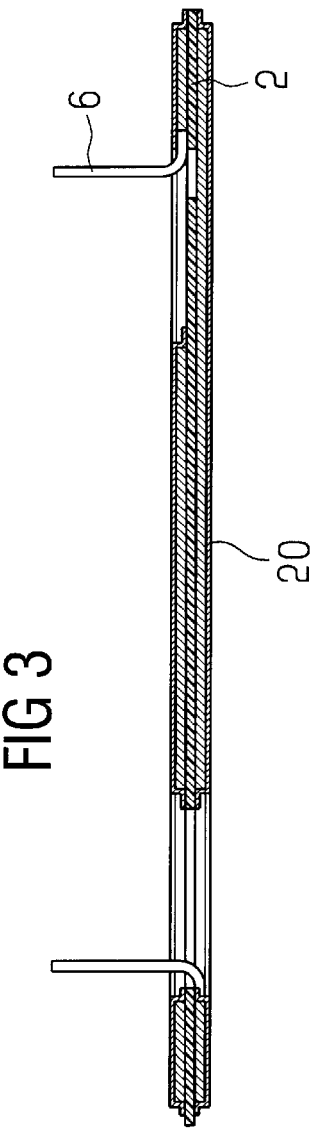
FIG. 3 depicts a cross sectional view of the capacitor bank board.

Reference is now made to the figures of the drawings in which elements that are identical or that function identically are identified by the same reference numerals throughout. FIG. 1 depicts a capacitor case 1 having a plurality of condensers (not shown) built therein. The case includes two modular connection members 5. The actual number of modular connection members may vary by application as would be appreciated by one skilled in the art. An enlarged view of the modular connection member is depicted in FIG. 5, which is discussed in more detail below.

FIG. 2 depicts a top view of a capacitor bank board 20. The board includes a flat conductor 2. The conductor 2 is designed and implemented, as is known to one skilled in the art to facilitate communication of power with the board and components thereon and/or therein. The flat conductor includes raised ends forming blade contacts 6. The broken line 22 depicts condenser battery case 1 as it would appear plugged into board 20.

FIG. 3 depicts a cross section of board 20 featuring ribbon cable or conductor 2 and blade contacts 6 which facilitate the communication of electrical power from an attached component to other components accommodated on or within the board. The blade contacts may be stamped out or effected in other ways envisioned by the skilled artisan.

Figure 4:
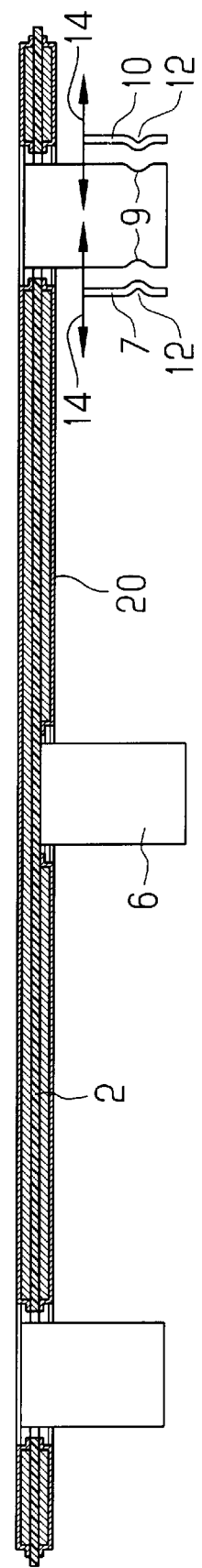
FIG. 4 depicts another cross sectional view of the capacitor bank board.

FIG. 4 depicts another cross sectional view of board 20 featuring a second lateral view of blade contacts 6. The contacts may be formed to include a recess 9. The recess is shaped so as to receive a mating protrusion 12 of a first contact lead 10 of a component connection member. The recess and protrusion cooperate so as to securely hold a first contact lead 10 against blade contact 6 so as to further facilitate the communication of electrical power therebetween. Arrows 14 indicate the movement direction of first contact lead 10 and blade contact 9 when the two are brought together. By this arrangement, blade contact 6 can be snapped and held in place by the cooperation of recess 9 and protrusion 12. The number of protrusions and recesses are limited by design choice provided the number of each is equal. A second contact lead 7, which acts similarly to first contact lead 10, is also depicted.

FIG. 5 depicts an enlarged view of connecting member 5. Connecting member 5 includes a pair of opposing first and second contact leads 10 and 7 respectively. The contact leads cooperate to resiliently accommodate an element therebetween. Such an element may include the blade conductor 6. First and second contact leads may further include at least one contact point 8 extending in between the two contact leads. The contact points may be opposing and identical in shape and composition. The contact points facilitate communication of electrical power with the blade contact 6 or any other element accommodated by the connecting member 5. The contact leads may also include at least one protrusion 12 spaced about the contact leads so as to receive a mating recess such as recess 9. The protrusions cooperate with mating recesses so as to snap fit an element, such as the blade contact, between the two contact leads. The contact leads, protrusions, and contact points are manufactured according to means known to one skilled in the art.

The connecting members are depicted (FIG. 1) at opposite ends of a capacitor case. By spacing the connecting members, parasitic inductance is reduced. Likewise, with the blade contacts having a short length sufficient for accommodating within the connecting members, board space is optimized for connection of additional condenser batteries and the like. The short length blade conductors have been shown to facilitate a rectifier inductance of less than 100 nanohenries. Furthermore, the cases can be attached in parallel such that when applied to rectifiers, inductance is reduced accordingly: $L_{rectifier} \sim (1/n_{cond}) + L_{system}$ where $n_{cond}$ is the number of connected condensers.

A method of implementing the above arrangement includes snapping and/or plugging a component, such as the condenser battery, to a board, such that the blade contacts are accommodated and securely held within the connecting member 5. The actual number of pairs of blade contacts and connecting members is a matter of design choice ranging from at least two to preferably four to six pairs per component. The preferred number has been demonstrated to effectively reduce parasitic inductance with operational current at, for example, 200 A per condenser.

The modular plugging and/or snapping arrangement is a simplification over prior connection methods with regard to number of necessary components parts and installation costs. Likewise, the current arrangement and method facilitate design choices regarding the number of condensers or other snapped on or plugged on components. An advantage of cooperating blade contacts and contact leads is that no additional elements or parts are needed with respect to making the conductor accessible to external components thereby reducing engineering and manufacturing costs while increasing design possibilities.

The invention being thus described, it will be obvious that the same may be varied in many ways. Such variations are not to be regarded as a departure from the spirit and scope of the invention, and all such modifications would be obvious to one skilled in the art are intended to be included within the scope of the following claims.

We claim:
1. A capacitor bank comprising:
   a printed circuit board having a first surface and including at least one blade electrical contact, said at least one blade contact defining an end of a conductor, said conductor for conducting electrical current, said end of said conductor being elevated from said first surface; and
   at least one capacitor defining a plurality of connection members internal to said at least one capacitor and further defining within at least one of said connection members a plurality of opposing contact leads for receiving said at least one blade contact therebetween, such that said printed circuit board is securely held to said at least one capacitor and electrical contact between said at least one blade contact and said plurality of opposing contact leads exists when said at least one blade contact is disposed between said plurality of opposing contact leads.

2. The arrangement according to claim 1, wherein said at least one capacitor comprises a plurality of capacitor components cooperating to form a capacitor bank.

3. The arrangement according to claim 1, wherein at least one of said plurality of opposing contact leads includes at least one protrusion and said at least one blade contact includes at least one recess such that said at least one recess accommodates said at least one protrusion therein thereby facilitating resilient accommodation of said at least one blade contact between said plurality of opposing contact leads.

4. The arrangement according to claim 2, wherein at least one of said plurality of capacitor components comprises two connection members.

5. The arrangement according to claim 2, wherein at least one of said plurality of capacitor components comprises four connection members.

6. The arrangement according to claim 2, wherein at least one of said plurality of capacitor components comprises six connection members.

7. The arrangement according to claim 1, wherein said plurality of connection members are spaced at distant locations within said at least one capacitor for the purpose of reducing parasitic inductance between connection members.

8. The arrangement according to claim 1, wherein at least one of said plurality of opposing contact leads further comprises at least one contact pad for electrically engaging said at least one blade contact.

9. The arrangement according to claim 8, wherein at least one of said plurality of opposing contact leads includes at least one protrusion and said at least one blade contacts includes at least one recess such that said at least one recess accommodates said at least one protrusion therein thereby facilitating resilient accommodation of said at least one blade contact between said plurality of opposing contact leads.

10. A method of forming a capacitor bank, comprising the steps of: forming at least one blade contact on a printed circuit board, said at least one blade contact defining an end of a conductor, said conductor for conducting electrical current, said end of said conductor being elevated from said printed circuit board; forming a plurality of connection members within at least one capacitor; defining within at least one of said connection members a plurality of opposing contact leads for receiving said at least one blade contact therebetween, such that said printed circuit board is securely held to said at least one capacitor and electrical contact between said at least one blade contact and said plurality of opposing contact leads exists when said at least one blade contact is disposed between said plurality of opposing contact leads; and disposing said at least one blade contact between said plurality of opposing contact leads.

11. The method according to claim 10, wherein said plurality of connecting members are located at opposing ends of said second part.

12. The method according to claim 10, wherein said at least one capacitor comprises a plurality of capacitor components cooperating to form a capacitor bank.

13. The method according to claim 12, wherein at least one of said plurality of capacitor components comprises four connection members.

14. The method according to claim 12, wherein at least one of said plurality of capacitor components comprises six connection members.

15. The method according to claim 12, further comprising the steps of: forming at least one recess within said at least one blade contact; forming at least one protrusion extending from at least one of said plurality of opposing contact leads; and engaging said at least one protrusion and said at least one recess when said at least one blade contact is disposed between said plurality of opposing contact leads, such that said at least one blade contact is resiliently accommodated between said plurality of opposing contact leads.

16. The method according to claim 12, further comprising the steps of: forming at least one electrical contact pad on at least one of said plurality of opposing contact leads; and engaging said at least one blade contact with said at least one electrical contact pad when said at least one blade contact is disposed between said plurality of opposing contact leads such that electrical communication between said second part and said blade conductor is facilitated by said electrical contact pad.

17. The method according to claim 12, wherein at least one of said plurality of capacitor components comprises two connection members.

18. The method according to claim 17, further comprising the step of: forming said plurality of connection members at distant locations within said at least one capacitor for the purpose of reducing parasitic inductance.

* * * * *